A. B. SHULTZ.
EXHAUST MANIFOLD OR PIPE CONNECTION FOR EXPLOSION ENGINES.
APPLICATION FILED JAN. 5, 1910.
976,610.
Patented Nov. 22, 1910.
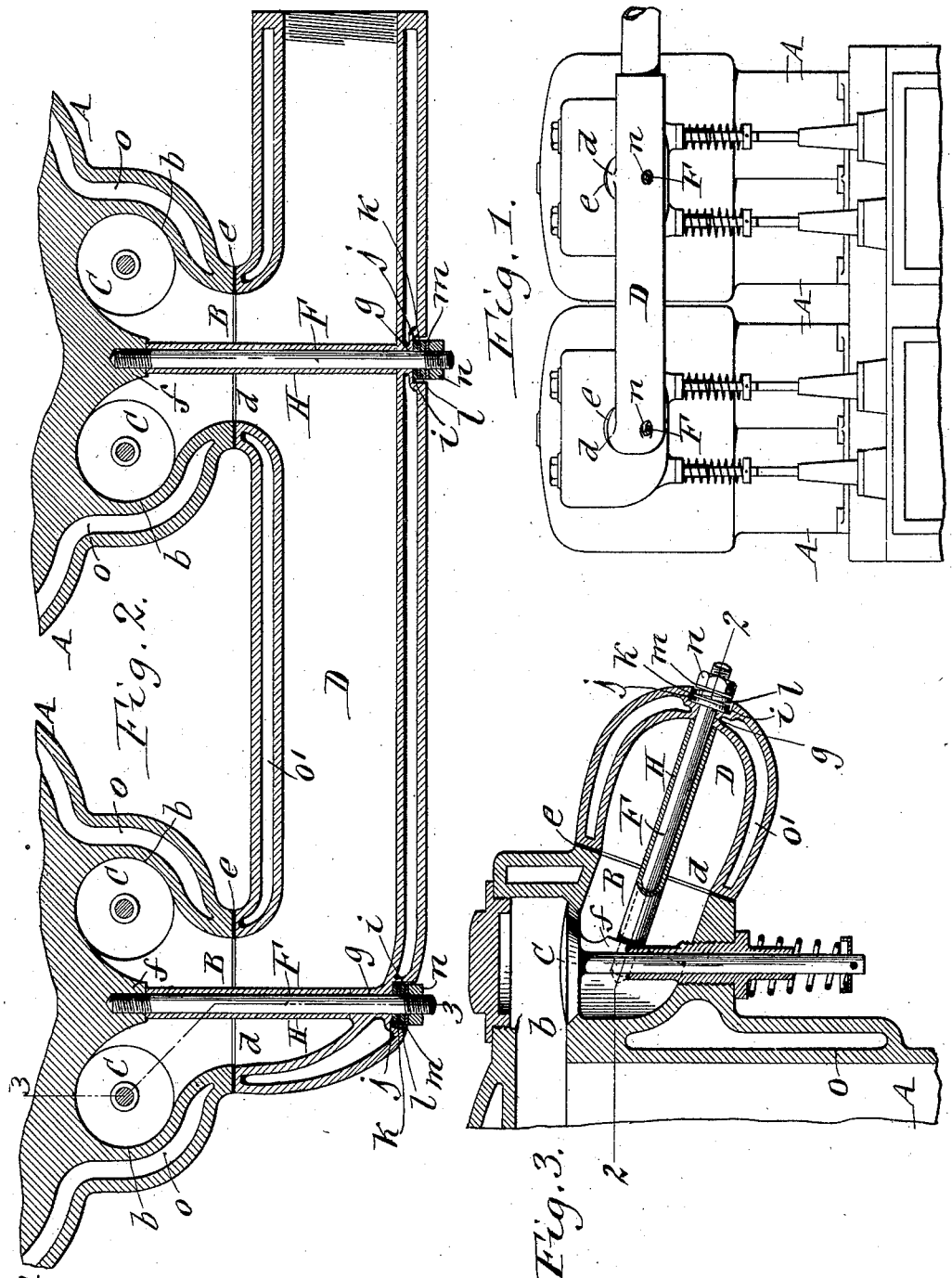
Witnesses:
Richard Sommel
John H. Shoemaker
Inventor
Albert B. Shultz
by Geyer & Popp
Attorneys

UNITED STATES PATENT OFFICE.

ALBERT B. SHULTZ, OF BUFFALO, NEW YORK.

EXHAUST-MANIFOLD OR PIPE CONNECTION FOR EXPLOSION-ENGINES.

976,610.  Specification of Letters Patent.  Patented Nov. 22, 1910.

Application filed January 5, 1910. Serial No. 536,496.

*To all whom it may concern:*

Be it known that I, ALBERT B. SHULTZ, a citizen of the United States, residing at Buffalo, in the county of Erie and State of New York, have invented new and useful Improvements in Exhaust-Manifolds or Pipe Connections for Explosion-Engines, of which the following is a specification.

This invention relates to the means for securing the exhaust pipe or manifold to the outlet or exhaust of the cylinder of an explosion engine. This has heretofore usually been effected by means of lugs projecting laterally from the exhaust pipe adjacent to the place of connection with the cylinder and secured to the latter by means of screws. This is not only unsightly in appearance but also does not permit of applying the pressure uniformly on the packing between the cylinder and the exhaust pipe, thereby resulting in leakage and it also prevents proper water-jacketing and cooling of the exhaust pipe, thereby causing the exhaust pipe to become unduly hot and burn off the paint applied thereto.

This invention has for its object the production of means for connecting the exhaust pipe or manifold with the engine cylinder which permits of applying uniform pressure on the gasket or packing between these parts, which permits of more effective water jacketing and cooling of the exhaust pipe or manifold, and which prevents variations in temperature from causing leaking in the joint between the cylinder and the exhaust pipe or manifold.

In the accompanying drawings: Figure 1 is a fragmentary elevation of a multiple gas engine having its exhaust manifold or pipe connected with the cylinders of the engine by my improved connecting means. Fig. 2 is a horizontal section, on an enlarged scale, in line 2—2, Fig. 3. Fig. 3 is a vertical transverse section in line 3—3, Fig. 2.

Similar letters of reference indicate corresponding parts throughout the several views.

Although my invention is applicable to explosion or gas engines of various designs that shown in the drawings for illustrating my invention comprises two pairs of upright cylinders A, A, each pair being preferably formed integrally and having their exhaust passages $b, b$ terminating in a single exhaust outlet B, and individual spring pressed exhaust-valves C each controlling one of said exhaust passages in any well known or approved manner.

D represents a horizontal exhaust manifold or pipe provided with one or more laterally projecting nipples $d$ which communicate with the exhaust outlets of the cylinders. Between the face of each of these nipples and the face around each outlet of the cylinders is arranged a packing or gasket $e$ of copper or other suitable material. Each of these nipples is held in place to form a tight joint with the respective cylinder outlet by means of my improved connecting device which is constructed as follows:—

F represents a horizontal tie rod or stud extending transversely through the exhaust manifold and axially through one of the exhaust nipples and secured at its inner end by an external screw thread thereon in an internally threaded recess formed in the wall $f$ between the exhaust passages of the respective pair of cylinders. At its outer end the tie rod is arranged in an opening $g$ formed in the exhaust manifold opposite the companion exhaust nipple. That part of the stud or tie rod within the exhaust manifold is inclosed by a protecting sleeve or tube H of cast iron or similar material which does not burn out readily, said sleeve bearing at its inner and outer ends against the cylinder wall $f$ and the inner side of the manifold and serving to save the stud or tie rod from the destructive action of the hot spent gases of the engine which pass from the cylinders through the exhaust manifold to the atmosphere. At the outer end of each stud or tie rod opening $g$ the manifold is provided on its outer side with a circular recess or pocket $i$. Surrounding the stud and bearing against the bottom of this recess is a packing $j$ of asbestos which prevents leakage of the exhaust gases through the joint between the manifold and the tie stud. Next to the outer side of the jacking $j$ an inner plain washer $k$ preferably of steel is applied to the stud. Outside of the inner plain washer a spring washer $l$ is mounted on the stud. The outer side of the spring washer is engaged by an outer plain washer $m$, preferably of steel, the latter is in turn engaged on its outer side by a screw nut $n$ applied to the outer screw threaded end of the stud. Upon tightening the screw nut $n$ the manifold is pressed with its nipple against the cylinder so as to produce a tight joint between the same, and the spring washer $l$ is strained so as to exert a constant tension on the stud. By this means any elongation of the stud due to heating of the same by the exhaust gases is taken up by the resilience of the spring washer which expands in the same measure as the stud increases in length, so that the manifold always bears firmly against the cylinders and forms a tight joint between the same through which the exhaust gases cannot leak.

By passing the stud centrally or axially through the nipple of the manifold the face of the nipple is pressed uniformly against the cylinder, thereby eliminating the possibility of leakage which frequently occurs when the manifold is secured to the cylinder at the side of its nipple. This arrangement of the stud is also much neater in appearance than a side connection, less expensive and more simple in construction and can also be applied and removed more easily than the construction heretofore used for this purpose.

The engine cylinders are provided with water jackets $o$ and the exhaust manifold is also provided with a water jacket $o^1$ for cooling these parts. The water jacket of the manifold is extended close to the bearing faces of the nipples and as the latter by means of the central stud or tie rod connection dispenses with the side connecting lugs heretofore in use it is possible to keep the nipples cooler and thus prevent the paint which is usually applied to the exhaust manifold, when the engine is new, from being burned off.

By providing the recess $i$ on the exterior of the exhaust manifold for the reception of the packing, spring washer and adjacent parts it is possible to bring this spring washer and packing more effectively under the cooling influence of the water jacket $o^1$ of the exhaust manifold and maintain the same in condition for producing a tight joint between the manifold and tie rod or stud.

I claim as my invention:

1. The combination of an explosion engine cylinder having an exhaust outlet, an exhaust pipe having a nipple communicating with said outlet, and means for connecting said cylinder and pipe comprising a stud arranged within said nipple, and a tension device interposed between said stud and manifold and operating to press the latter yieldingly against the cylinder.

2. The combination of an explosion engine cylinder having an exhaust outlet, an exhaust pipe having a nipple communicating with said outlet and provided on the side opposite its nipple with an opening, a stud arranged in said nipple and secured at its inner end to the cylinder while its outer end passes through said opening, a packing applied to said stud and bearing against the outer side of said manifold, and a pressure device applied to said stud and bearing against the outer side of said packing.

3. The combination of an explosion engine cylinder having an exhaust outlet, an exhaust pipe having a nipple communicating with said outlet and provided on the side opposite its nipple with an opening, a stud arranged in said nipple and secured at its inner end to the cylinder while its outer end passes through said opening, a packing applied to said stud and bearing against the outer side of said manifold, a screw nut arranged on the outer end of said stud, and a spring washer interposed between said packing and nut.

4. The combination of an explosion engine cylinder having an exhaust outlet, an exhaust pipe having a nipple communicating with said outlet and provided on the side opposite its nipple with an opening and a recess at the outer end of said opening and water jacket adjacent to said opening and recess, a stud arranged in said nipple and secured at its inner end to the cylinder while its outer end passes through said opening and recess, a packing surrounding said stud and bearing against the bottom of said recess, and a tension device mounted on the outer end of the stud and bearing against the packing.

5. The combination of an explosion engine cylinder having an exhaust outlet, an exhaust pipe having a nipple communicating with said outlet and provided on the side opposite its nipple with an opening, and a recess at the outer end of said opening and water jacket adjacent to said opening and recess, a stud arranged in said nipple and secured at its inner end to the cylinder while its outer end passes through said opening and recess, a packing surrounding said stud and bearing against the bottom of said recess, a screw nut applied to the outer end of the stud, and a spring washer interposed between said packing and screw nut.

Witness my hand this 3rd day of January 1910.

ALBERT B. SHULTZ.

Witnesses:
 THEO. L. POPP,
 E. M. GRAHAM.